US009210294B2

(12) United States Patent
Longacre, Jr. et al.

(10) Patent No.: US 9,210,294 B2
(45) Date of Patent: *Dec. 8, 2015

(54) SYSTEM AND METHOD TO MANIPULATE AN IMAGE

(71) Applicant: Hand Held Products, Inc., Fort Mill, SC (US)

(72) Inventors: Andrew Longacre, Jr., Skaneateles, NY (US); Thomas Hawley, Skaneateles, NY (US); Matthew Pankow, Camillus, NY (US)

(73) Assignee: Hand Held Products, Inc., Fort Mill, SC (US)

( * ) Notice: Subject to any disclaimer, the term of this patent is extended or adjusted under 35 U.S.C. 154(b) by 49 days.

This patent is subject to a terminal disclaimer.

(21) Appl. No.: 14/153,182

(22) Filed: Jan. 13, 2014

(65) Prior Publication Data

US 2014/0125999 A1    May 8, 2014

Related U.S. Application Data

(63) Continuation of application No. 12/151,103, filed on May 2, 2008, now Pat. No. 8,630,491.

(60) Provisional application No. 60/927,540, filed on May 3, 2007.

(51) Int. Cl.
| | | |
|---|---|---|
| G06K 9/48 | (2006.01) | |
| G06K 9/22 | (2006.01) | |
| H04N 1/40 | (2006.01) | |
| G06K 9/32 | (2006.01) | |

(52) U.S. Cl.
CPC ............ *H04N 1/40068* (2013.01); *G06K 9/228* (2013.01); *G06K 9/3208* (2013.01); *G06K 9/3233* (2013.01); *G06K 9/3275* (2013.01)

(58) Field of Classification Search
USPC .................................................. 382/199, 313
See application file for complete search history.

(56) References Cited

U.S. PATENT DOCUMENTS

| | | | |
|---|---|---|---|
| 5,773,806 A | 6/1998 | Longacre, Jr. | |
| 5,987,163 A | 11/1999 | Matsuda | |
| 6,575,367 B1 | 6/2003 | Longacre, Jr. | |
| 6,728,391 B1 | 4/2004 | Wu et al. | |
| 6,895,116 B2 | 5/2005 | Yen et al. | |
| 7,151,860 B1 * | 12/2006 | Sakai et al. | 382/297 |
| 7,347,374 B2 | 3/2008 | Zhu et al. | |
| 8,630,491 B2 * | 1/2014 | Longacre et al. | 382/199 |
| 2002/0125317 A1 | 9/2002 | Hussey et al. | |
| 2003/0197063 A1 | 10/2003 | Longacre, Jr. | |
| 2004/0206821 A1 | 10/2004 | Longacre et al. | |
| 2004/0256465 A1 | 12/2004 | Longacre, Jr. | |
| 2004/0262392 A1 | 12/2004 | Longacre et al. | |
| 2004/0262394 A1 | 12/2004 | Longacre et al. | |

(Continued)

*Primary Examiner* — John Strege

(74) *Attorney, Agent, or Firm* — Additon, Higgins & Pendleton, P.A.

(57) ABSTRACT

A method of operating an image reader typically includes: searching a digital image for nominally straight edges; characterizing the nominally straight edges in terms of length and/or direction; determining a predominant orientation of the nominally straight edges; establishing a group of edges as a function of their proximity to the center of the image; establishing a group of edges as a function of their proximity to other remaining edge positions; and transmuting a rectangle bounding those edges into a rectified image. The rectified image is typically an image that is cropped or rotated.

20 Claims, 5 Drawing Sheets

(56) References Cited

U.S. PATENT DOCUMENTS

| | | |
|---|---|---|
| 2004/0262395 A1 | 12/2004 | Longacre et al. |
| 2004/0262396 A1 | 12/2004 | Longacre et al. |
| 2004/0262399 A1 | 12/2004 | Longacre et al. |
| 2005/0092843 A1 | 5/2005 | Dowling et al. |
| 2005/0103868 A1 | 5/2005 | Zhu et al. |
| 2007/0080965 A1 | 4/2007 | Kondo et al. |

* cited by examiner

Fig. 2

SYSTEM AND METHOD TO MANIPULATE AN IMAGE

FIELD OF THE INVENTION

The invention relates to data collection in general and particularly to a system and method for manipulation of images.

BACKGROUND OF THE INVENTION

Indicia reading devices (also referred to as scanners, image reader, readers, etc.) typically read data represented by printed indicia, (also referred to as symbols, symbology, bar codes, etc.) For instance one type of a symbol is an array of rectangular bars and spaces that are arranged in a specific way to represent elements of data in machine readable form. Indicia reading devices typically transmit light onto a symbol and receive light scattered and/or reflected back from a bar code symbol or indicia. The received light is interpreted by an image processor to extract the data represented by the symbol. Optical indicia reading devices typically utilize visible light. Laser indicia reading devices typically utilize transmitted laser light.

One-dimensional (1D) optical bar code readers are characterized by reading data that is encoded along a single axis, in the widths of bars and spaces, so that such symbols may be read from a single scan along that axis, provided that the symbol is imaged with a sufficiently high resolution along that axis.

In order to allow the encoding of larger amounts of data in a single bar code symbol, a number of 1D stacked bar code symbologies have been developed which partition encoded data into multiple rows, each including a respective 1D bar code pattern, all or most all of which must be scanned and decoded, then linked together to form a complete message. Scanning still requires relatively higher resolution in one dimension only, but multiple linear scans are needed to read the whole symbol.

A class of bar code symbologies known as two dimensional (2D) matrix symbologies have been developed which offer orientation-free scanning and greater data densities and capacities than 1D symbologies. 2D matrix codes encode data as dark or light data elements within a regular polygonal matrix, accompanied by graphical finder, orientation and reference structures.

Often times an optical reader may be portable and wireless in nature thereby providing added flexibility. In these circumstances, such readers form part of a wireless network in which data collected within the terminals is communicated to a host computer situated on a hardwired backbone via a wireless link. For example, the readers may include a radio or optical transceiver for communicating with a remote computer.

Some data collection devices, such as hand-held image readers, are capable of capturing images as well as reading barcodes. The reading and decoding of a barcode represents an operation distinct from that involved in capturing a image. The reading and decoding of a bar code involves the imaging and then decoding of a one or two dimensional graphic symbol into the alphanumeric sequence encoded by the symbol. The capturing of an image involves storing an electronic visual copy/representation of the image.

Efforts regarding such systems have led to continuing developments to improve their versatility, practicality and efficiency.

BRIEF DESCRIPTION OF THE DRAWINGS

FIG. 2 shows an exemplary form.

DETAILED DESCRIPTION OF THE INVENTION

The invention features a system and method for automatically discriminating between different types of data with an image reader. A human operator may aim a hand-held image reader at a target containing a form, information bearing indicia (IBI) or dataform, text, or other element and actuate a trigger on an image reader. An IBI or dataform may be an originally machine generated symbology that is also machine readable, such as a 1-D barcode, a 2-D barcode, a 1-D stacked barcode, a logo, glyphs, color-codes, and the like.

When using an embodiment of an image reader, a human operator may intuitively point the reader directly at the data to be collected, regardless of its type, and actuate a trigger.

Figure 1:
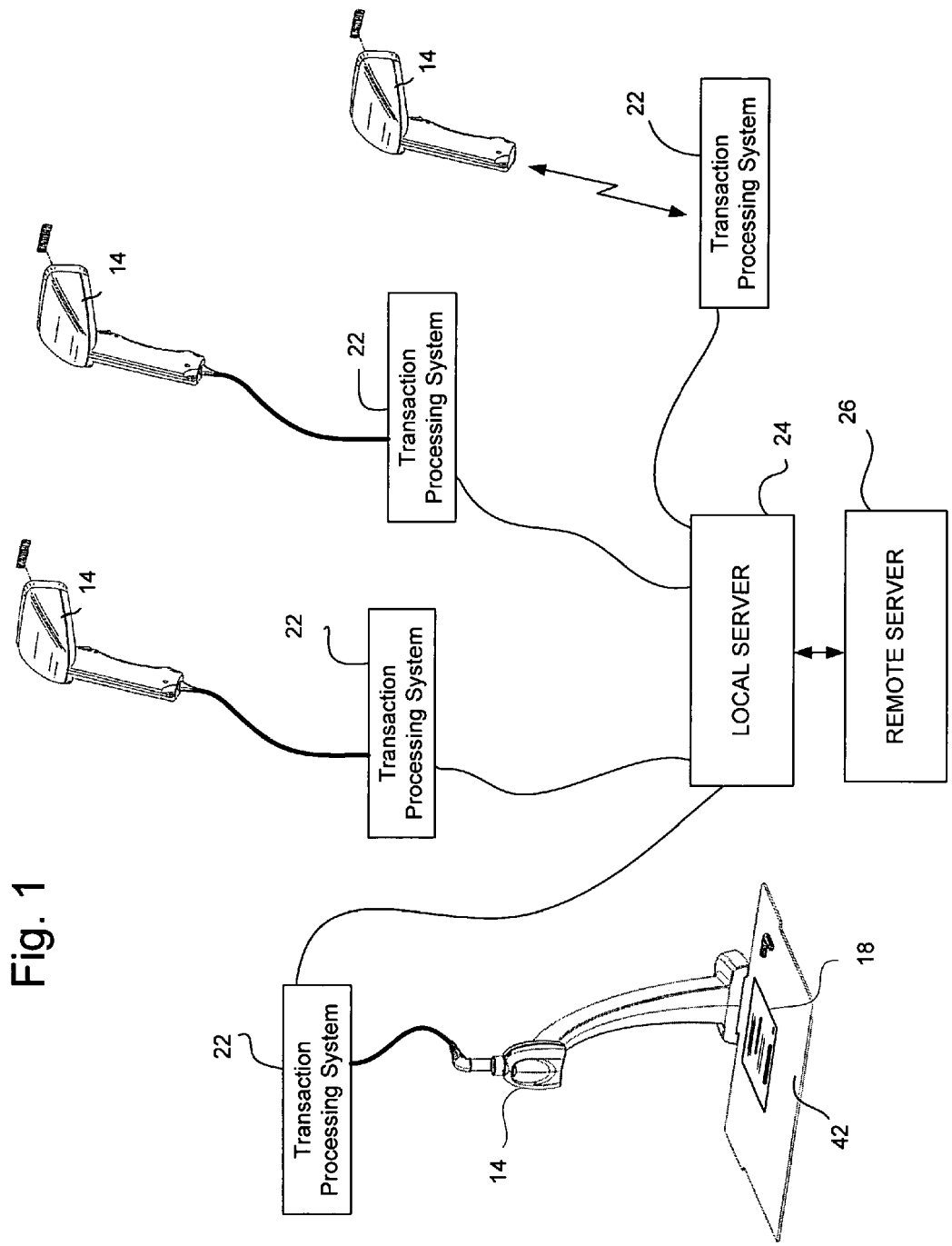
FIG. 1 shows an exemplary image reader system.

FIG. 1 illustrates a scanning system configuration in accordance with the present invention, wherein a plurality of image readers 14 are being operated or utilized in a facility, such as a retail store. An image reader has an imaging field of view which represents the entire image captured and digitized by an image sensor provided therein. The image readers may be in communication (wired or wireless) to a local transaction processing system 22, such as a cash register, customer station or employee station. The transaction processing systems 22 may be in communication (wired or wireless) with a local server 24 and/or a remote server 26. An image reader 14 may be placed on a stand 40 for viewing a document 18 which may be placed on a surface 42 or platen.

Figure 2:
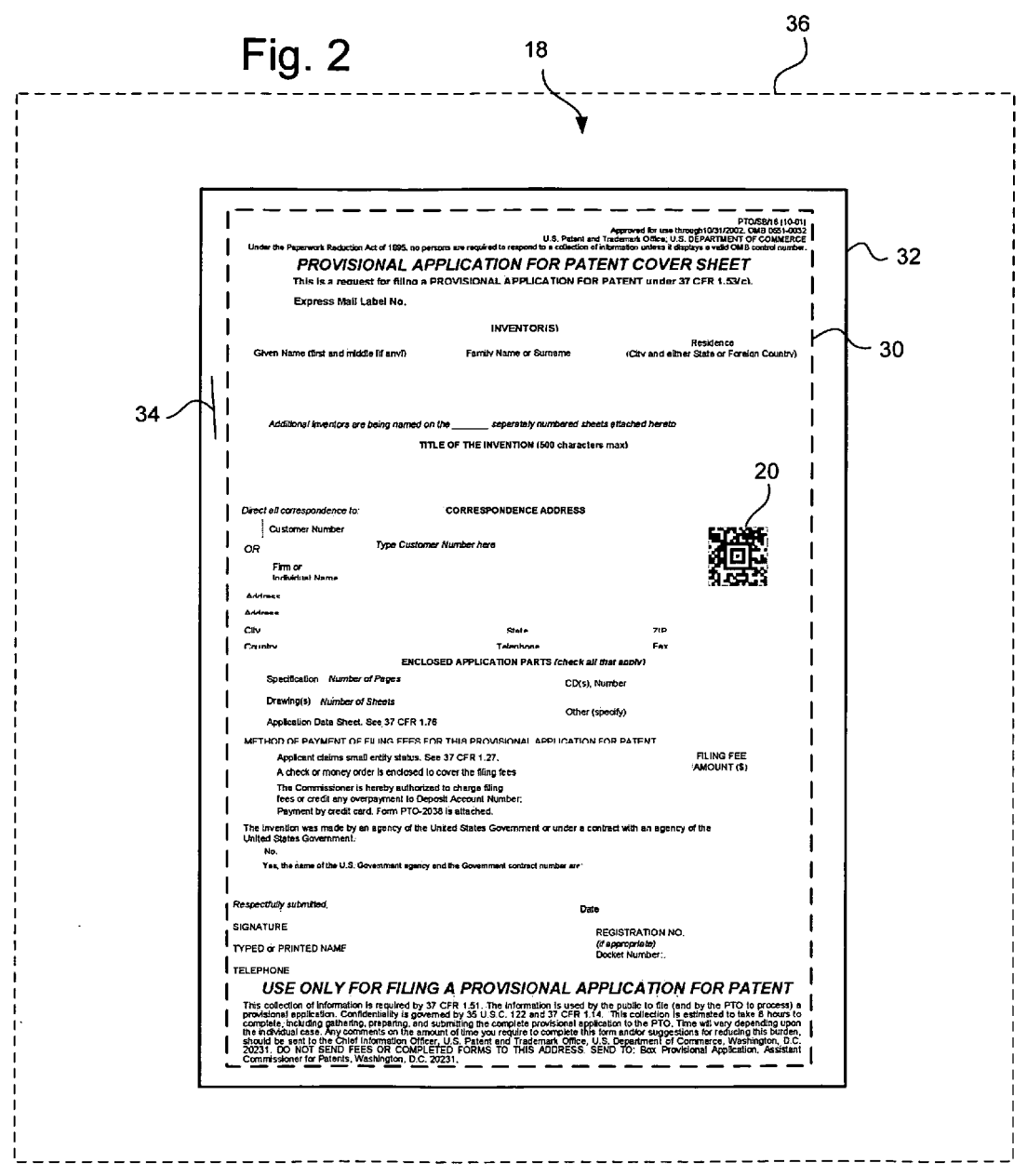

FIG. 2 illustrates a form 18 with various types of data that may automatically be collected by an image reader 14. The collection process involves the human operator placing a target, such as a form in the field of view of an image reader. The operator may actuate a trigger on an image reader 14 for any data type to be read or the reader 14 may automatically image the target. The data shown may include typed text, an IBI, such as a two-dimensional barcode encoding a label number, a signature, hand-written text, etc.

An image reader may be used as a document scanner as well as an IBI reader for use in certain exemplary situations, such as a pharmacy or other retail application, wherein a pharmacy may desire to keep electronic records of documents or forms, such as prescriptions. The image reader may be placed in a stand, and prescription documents may be placed under the image reader, and images of the prescription documents may be taken. Prescriptions may be on many different sizes of paper, which may result in different image file sizes, some of which may be undesirably large. For example, a large document may take up the entire field of view of the image reader, however a very small document may only take up a small portion of the imager field of view.

A method to minimize image file size may be to binarize the image (i.e. turn it into a 1 bit-per-pixel image so that each dot or pixel is either black or white instead of grayscale), and then compress the data using a lossless algorithm such as a CCITT T6 Group 4 compression.

It may not be desirable to retain an entire image after a form is imaged. In an exemplary embodiment, the size of an image may be reduced through a process referred to herein as image cropping. An exemplary image cropping process is taking an image, looking at that image to determine a region or regions of interest, and cropping the image so that the resulting image only includes the region(s) of interest. The unwanted portions of the image are cut or cropped out of the image. Other exemplary embodiments of the invention may include correction of angular distortion or incorrect rotational orientation caused by improper location of the imager relative to the object being imaged and correcting for this by rotating the image electronically. In another exemplary embodiment, other image processing may be utilized on the image taken for different effects, such as flattening of the image (i.e. adjusting to make the dark/light contrast uniform across the cropped image), or other filtering techniques which may help to make the resulting image more appealing.

An exemplary embodiment for cropping an image may be to search at least two digitized images, one image taken at full or high resolution and one taken with reduced or lower resolution to determine nominally straight edges within the image(s). These nominally straight edges may then be characterized in terms of length and direction (i.e. vectors) and a determination may be made as to which edge orientation predominates. All edges not nominally parallel or perpendicular to a predominate orientation may be discarded. A group of edges that comprise a form may then be chosen by their proximity to the center of the image and then their proximity to other remaining edge positions. The process may then transmute a rectangle bounding those edges into a rectified image. The rectified image may be a cropped or rotated image.

The digitized images may be binarized if they are captured as grayscale images. Binarization may be a process of turning the pixels of an image from grayscale or pixels having multi-bit values to binary value pixels, so that each dot or pixel is either black (e.g. 1) or white (e.g. 0).

In an exemplary embodiment, higher and lower resolution images may be derived or obtained from a single image capture taken by the image reader, viewed both at high resolution and at reduced or lower resolution. Full resolution may be considered the highest resolution. The searches for nominally straight edges may be done in succession. Both sets of straight edges may contribute to the same pool of candidate edges. Some edges may appear in both images, and contribute twice to the search.

An exemplary embodiment for cropping a single image capture may be to search a digitized image for nominally straight edges within the image. These nominally straight edges may then be characterized in terms of length and direction. By examining a histogram of those directions, a predominate (or predominant) orientation may be determined. All edges not nominally parallel or perpendicular to the predominate orientation may be discarded. A group or plurality of edges that comprise a form within an imager field of view may then be chosen by their proximity to the center of the image and then their proximity to other remaining edge positions. The process may then transmute a rectangle bounding those edges into a rectified image. The form may considered a specific region of interest.

The particular method of making a determination of a specific region or regions of interest within an imager field of view depends on the complexity desired by a user. For example, a specific region of interest may be determined by having a known template on the surface 42 where a document or form to be imaged is placed. The exemplary template may have a known pattern such as evenly spaced dots, or a grid of some type, wherein so that placing a document on the grid breaks the pattern and reveals where the document is.

Another exemplary embodiment for finding a region or regions of interest is by mapping the energy of the image. High energy areas (i.e. areas with large pixel value variation in relatively close proximity, thus representing high contrast areas) might be considered regions of interest. After these high energy areas are established, an area within the image may be determined by including all of these regions of interest, and the image is cropped to that new area.

Another exemplary technique for determining a region of interest may include determining congruent lines of activity for rotational adjustment.

Another exemplary embodiment is to provide location of a stand 40 relative to the area to be imaged, wherein angular distortion may be determined and correction may then be applied.

Edge data may be utilized to establish predominant orthogonal horizontal and/or vertical directions which may be interpreted as representing features of a form if the presence of a form has not been assumed. If the predominant horizontal and/or vertical edges have been established, horizontal and/or vertical outer form boundaries may be established. In an exemplary embodiment, predominant horizontal edges may be established first, and then predominant vertical edges.

Image rectification may be performed automatically after an image has bee captured by the image reader.

FIG. 2 illustrates a cropping function wherein the image representative image data that may be stored has a smaller outer form edge 30 than the original, actual outer form edge 32 or from the entire image taken or read. In this manner, the image data file size may be minimized and extraneous or unwanted features (e.g. feature 34) do not have to become part of the stored or exported image data file.

In an exemplary embodiment, once a predominant edge orientation is established, the image may be electronically rotated if, for example, an operator does not place a form properly square with the image reader when imaging the form.

In an exemplary embodiment, a processor looks at an image to determine a region or regions of interest and then crops the image (i.e. cutting portions of the image out) so that the resulting image only includes the region(s) of interest. An exemplary embodiment may comprise correction of angular distortion or rotational orientation caused by improper location or positioning of the imager relative to the object being imaged. An exemplary embodiment may comprise other image processing effects such as flattening of the image (i.e. adjusting to make the dark/light contrast uniform across the cropped image), and/or other filtering techniques which may help to make the resulting image look better to the human eye.

An exemplary embodiment may comprise determining congruent lines of activity for rotational adjustment. A transformation matrix may be utilized to orient the image.

Another exemplary embodiment is to use a reader stand relative to the area to be imaged for angular distortion correction.

In an exemplary embodiment, a programmed processor searches two binarized images, one full resolution and one with reduced resolution, for nominally straight edges, characterizing them in terms of length and direction, taking a histogram of those directions and determining a predominant orientation therefrom and discarding all edges not nominally parallel or perpendicular to the predominant orientation. Proximity of the nominally straight edges to the center of the image(s) and to other remaining edge positions may be utilized to determined a group of edges that may comprise a form. A rectified image may be determined by transmuting a rectangle that bounds those edges. The two binarized images may be derived from a single captured image, viewed both at full resolution and at reduced resolution. The searches may be done in succession. Both sets of nominally straight edges may contribute to the same pool of candidate edges for image rectification. Some edges may appear in both images, and contribute twice.

Figure 3:
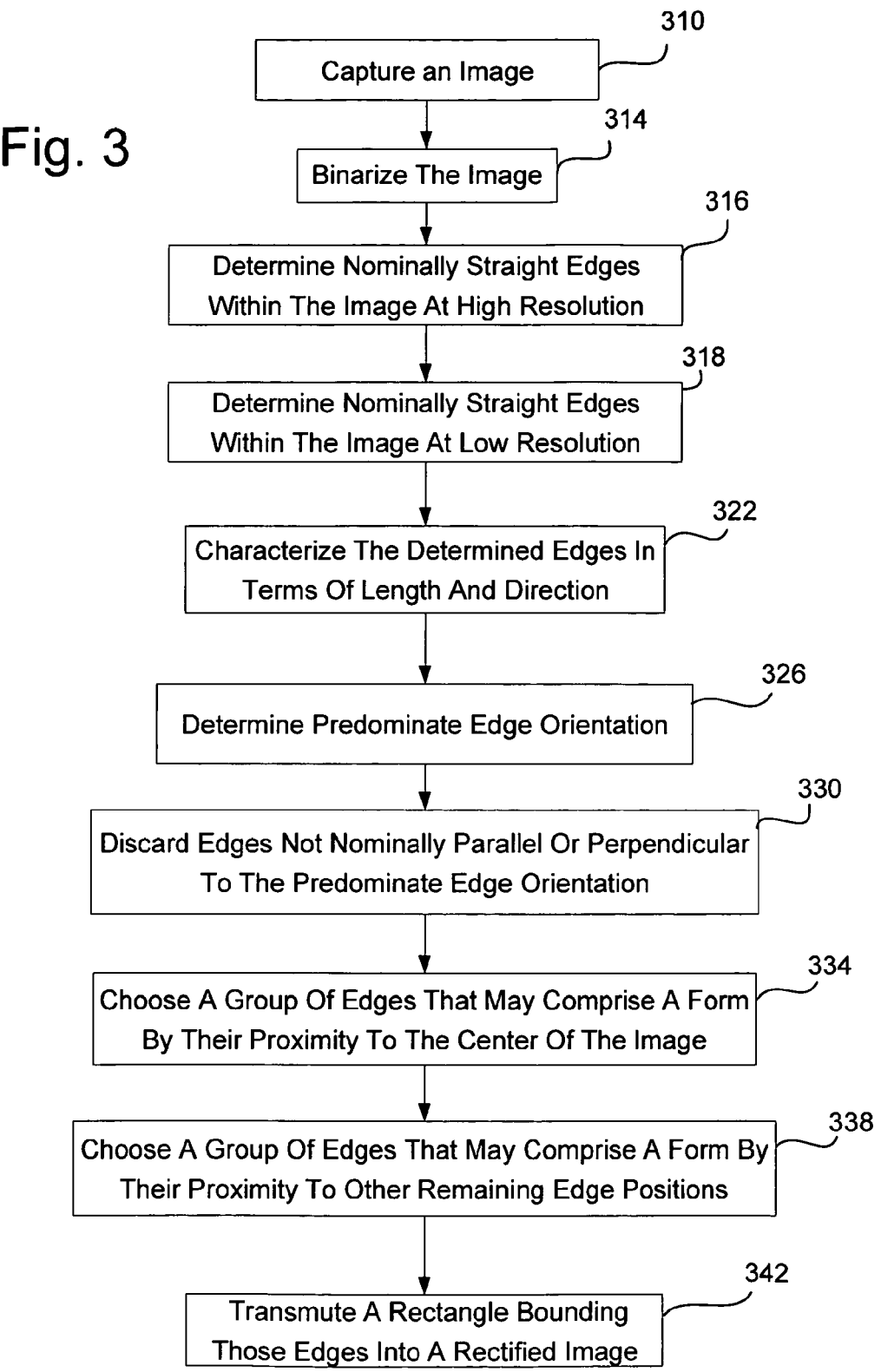
FIG. 3 shows a flowchart of an exemplary process.

FIG. 3 is a flowchart of an exemplary process comprising the steps of: capturing an image (310); binarizing the image (314); determining nominally straight edges within the image at higher resolution (316); determining nominally straight edges within the image at lower resolution (318); characterizing the determined edges in terms of length and direction (322); determining a predominate edge orientation (326); discarding edges not nominally parallel or perpendicular to the predominate edge orientation (330); choosing a group of edges that comprise a form by their proximity to the center of the image (334); choosing a group of edges that comprise a form by their proximity to other remaining edge positions (338); and, transmuting a rectangle bounding those edges into a rectified image (342).

Many functions of electrical and electronic apparatus may be implemented in hardware (for example, hard-wired logic), in software (for example, logic encoded in a program operating on a general purpose processor), and in firmware (for example, logic encoded in a non-volatile memory that is invoked for operation on a processor as required). Substitution of one implementation of hardware, firmware and software for another implementation of the equivalent functionality using a different one of hardware, firmware and software may be considered. To the extent that an implementation may be represented mathematically by a transfer function, that is, a specified response is generated at an output terminal for a specific excitation applied to an input terminal of a "black box" exhibiting the transfer function, any implementation of the transfer function, including any combination of hardware, firmware and software implementations of portions or segments of the transfer function may be considered.

Figure 4:
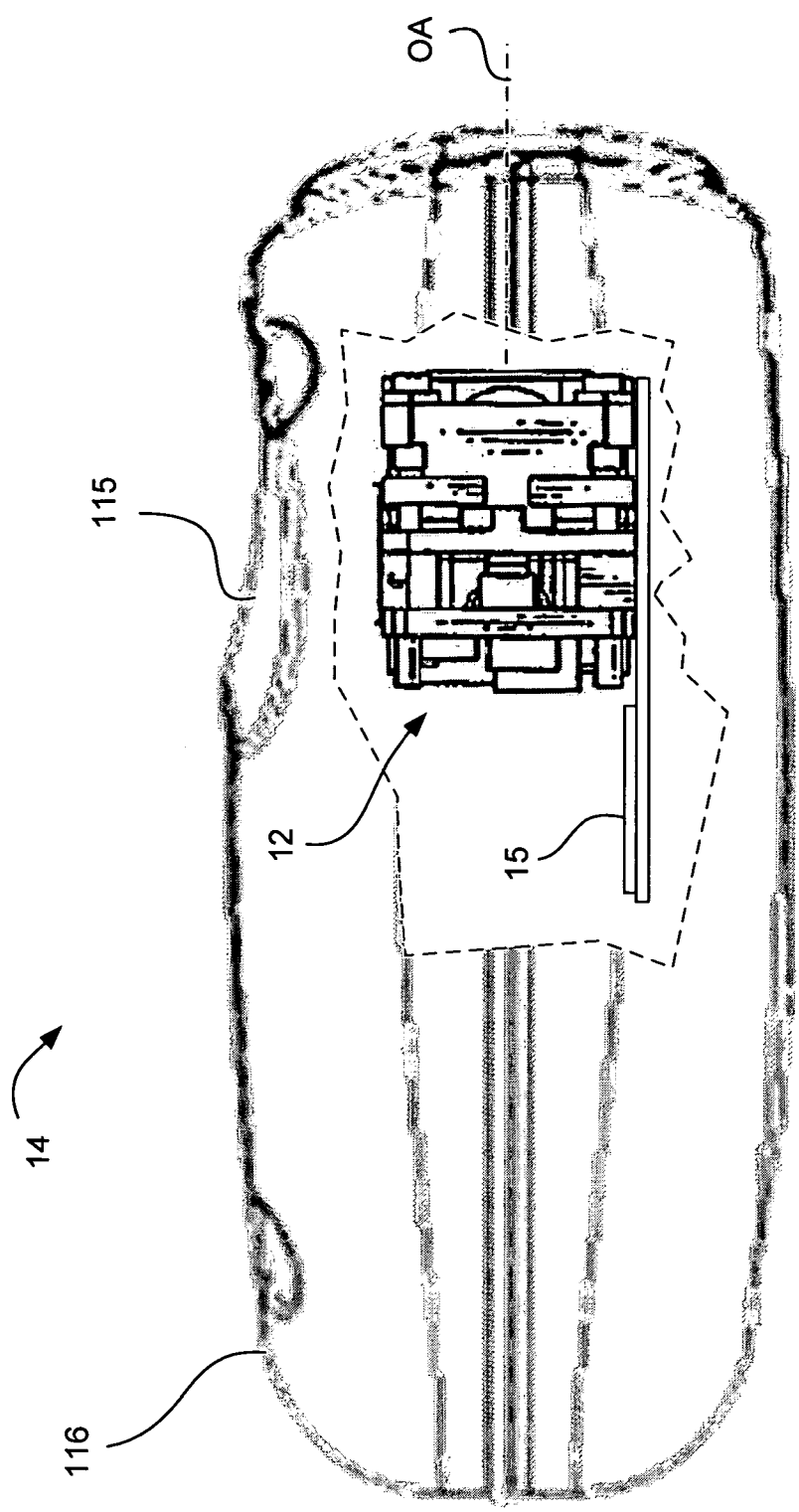
FIG. 4 is a fragmentary partially cutaway side view of an exemplary image reader.
Figure 5:
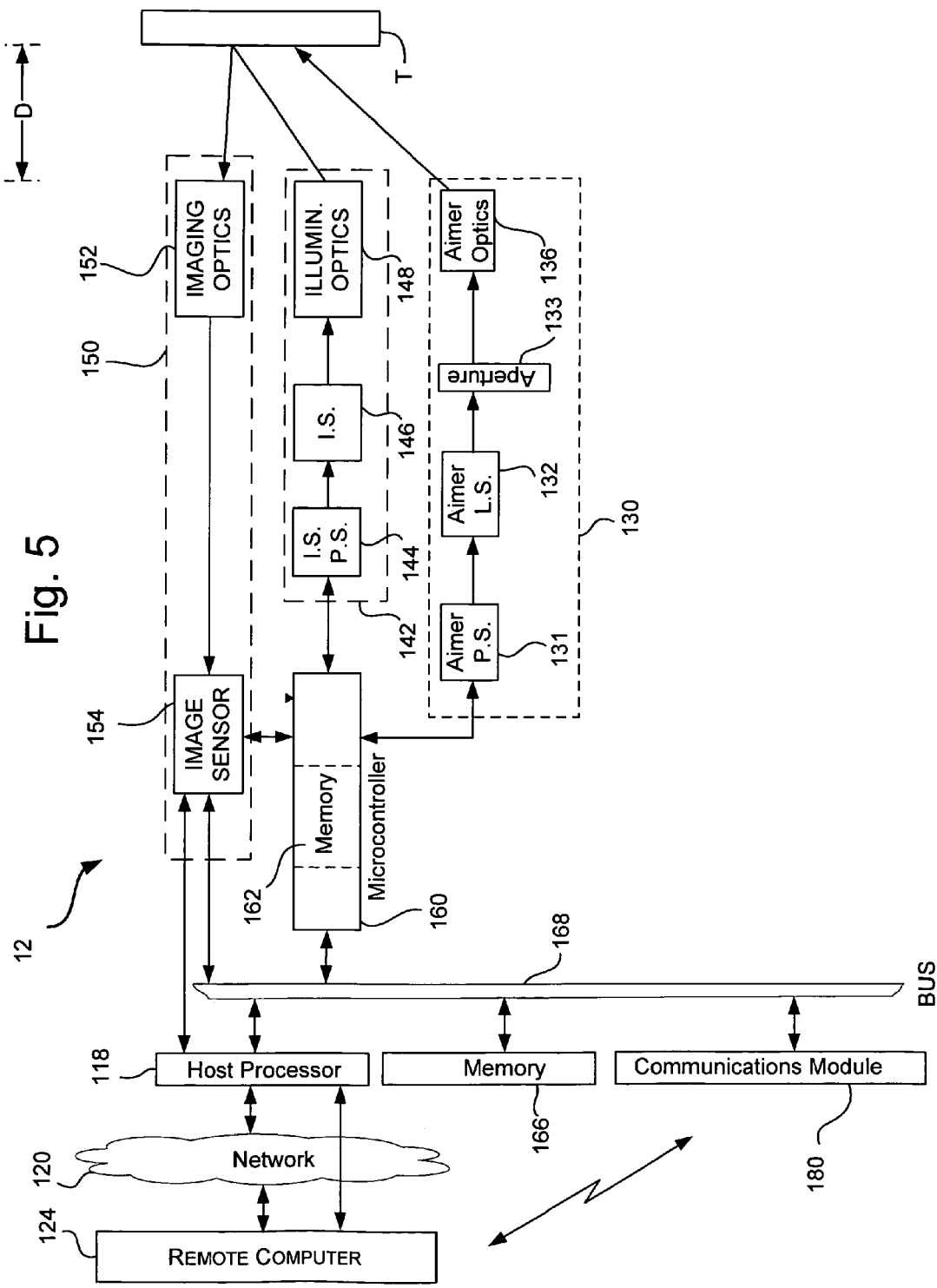
FIG. 5 is a block schematic diagram of an exemplary imaging module.

Referring to FIGS. 4 and 5, an exemplary optical indicia reader 14 may have a number of subsystems for capturing and reading images, some of which may have symbol indicia provided therein. Reader 14 may have an imaging reader assembly 12 provided within a head portion or housing 116 which may be configured to be hand held by an operator. A trigger 115 may be used to control operation of the reader 14. Image reader assembly 12 has imaging receive optics 152 having an optical axis (OA) for receiving light reflected from a target T and directing or projecting the reflected light from the target T to an image sensor 154. The optical axis is a line of symmetry through the imaging optics.

The receive optics 152 has a focal point wherein parallel rays of light coming from infinity converge at the focal point. If the focal point is coincident with the image sensor, the target (at infinity) is "in focus". A target T is said to be in focus if light from target points are converged about as well as desirable at the image sensor. Conversely, it is out of focus if light is not well converged. "Focusing" is the procedure of adjusting the distance between the receive optics and the image sensor to cause the target T to be approximately in focus.

The target may be any object or substrate and may bear a 1D or 2D bar code symbol or text or other machine readable indicia. A trigger 115 may be used for controlling full or partial operation of the reader 14.

Image sensor 154 may be a two-dimensional array of pixels adapted to operate in a global shutter or full frame operating mode which is a color or monochrome 2D CCD, CMOS, NMOS, PMOS, CID, CMD, etc. solid state image sensor. This sensor contains an array of light sensitive photodiodes (or pixels) that convert incident light energy into electric charge. Solid state image sensors allow regions of a full frame of image data to be addressed.

In a full frame (or global) shutter operating mode, the entire imager is reset before integration to remove any residual signal in the photodiodes. The photodiodes (pixels) then accumulate charge for some period of time (exposure period), with the light collection starting and ending at about the same time for all pixels. At the end of the integration period (time during which light is collected), all charges are simultaneously transferred to light shielded areas of the sensor. The light shield prevents further accumulation of charge during the readout process. The signals are then shifted out of the light shielded areas of the sensor and read out.

Image sensor 154 may read images with illumination from a source other than illumination source 146, such as by illumination from a source located remote from the reader.

The output of the image sensor may be processed utilizing one or more functions or algorithms to condition the signal appropriately for use in further processing downstream, including being digitized to provide a digitized image of target T.

Microcontroller 160 may perform a number of functions. The particulars of the functionality of microcontroller 160 may be determined by or based upon certain configuration settings or data which may be stored in memory or firmware 162, 166. One such function may be controlling the amount of illumination provided by illumination source 146 by controlling the output power provided by illumination source power supply 144. Microcontroller 160 may also control other functions and devices.

Microcontroller 160 may include a predetermined amount of memory 162 for storing firmware and data. The firmware may be a software program or set of instructions embedded in or programmed on the microcontroller which provides the necessary instructions for how the microcontroller operates and communicates with other hardware. The firmware may be stored in the flash memory (ROM) of the microcontroller as a binary image file and may be erased and rewritten. The firmware may be considered "semi-permanent" since it remains the same unless it is updated. This firmware update or load may be handled by a device driver.

The components in reader 14 may be connected by one or more bus 168 or data lines, such as an Inter-IC bus such as an I²C bus, which is a control bus that provides a communications link between integrated circuits in a system. This bus may connect to a host computer in relatively close proximity, on or off the same printed circuit board as used by the imaging device. I²C is a two-wire serial bus with a software-defined protocol and may be used to link such diverse components as the image sensor 154, temperature sensors, voltage level translators, EEPROMs, general-purpose I/O, A/D and D/A converters, CODECs, and microprocessors/microcontrollers.

The functional operation of the host processor 118 may involve the performance of a number of related steps, the particulars of which may be determined by or based upon certain configuration settings stored in memory 166 which may be any one of a number of memory types such as RAM, ROM, EEPROM, etc. In addition some memory functions may be stored in memory 162 provided as part of the microcontroller 160.

An exemplary function of the host processor 118 may be to decode machine readable symbology provided within the target or captured image. One dimensional symbologies may include very large to ultra-small, Code 128, Interleaved 2 of 5, Codabar, Code 93, Code 11, Code 39, UPC, EAN, and MSI. Stacked 1D symbologies may include PDF, Code 16K and Code 49. 2D symbologies may include Aztec, Datamatrix, Maxicode, and QR-code. UPC/EAN bar codes are standardly used to mark retail products throughout North America, Europe and several other countries throughout the worlds. Decoding is a term used to describe the interpretation of a machine readable code contained in an image projected on the image sensor 154. The code has data or information encoded therein. Information respecting various reference decode algorithm is available from various published standards, such as by the International Standards Organization ("ISO").

An exemplary function of host processor 118 may be to manipulate images, such as cropping or rotation such as described herein.

Imaging reader assembly 12 may also have an aiming generator light source 132, aiming aperture 133, aiming optics 136, an illumination source(s) 146 and illumination optics 148.

Illumination and aiming light sources with different colors may be employed. For example, in one such embodiment the image reader may include white and red LEDs, red and green LEDs, white, red, and green LEDs, or some other combination chosen in response to, for example, the color of the symbols most commonly imaged by the image reader. Different colored LEDs may be each alternatively pulsed at a level in accordance with an overall power budget.

Aiming pattern generator 130 may include a power supply 131, light source 132, aperture 133 and optics 136 to create an aiming light pattern projected on or near the target which spans a portion of the receive optical system 150 operational field of view with the intent of assisting the operator to properly aim the scanner at the bar code pattern that is to be read. A number of representative generated aiming patterns are possible and not limited to any particular pattern or type of pattern, such as any combination of rectilinear, linear, circular, elliptical, etc. figures, whether continuous or discontinuous, i.e., defined by sets of discrete dots, dashes and the like.

Generally, the aiming light source may comprise any light source which is sufficiently small or concise and bright to provide a desired illumination pattern at the target. For example, light source 132 for aiming generator 130 may comprise one or more LEDs 134.

The light beam from the LEDs 132 may be directed towards an aperture 133 located in close proximity to the LEDs. An image of this back illuminated aperture 133 may then be projected out towards the target location with a lens 136. Lens 136 may be a spherically symmetric lens, an aspheric lens, a cylindrical lens or an anamorphic lens with two different radii of curvature on their orthogonal lens axis. Alternately, the aimer pattern generator may be a laser pattern generator.

The light sources 132 may also be comprised of one or more laser diodes. In this case a laser collimation lens (not shown in these drawings) will focus the laser light to a spot generally forward of the scanning hear and approximately at the plane of the target T. This beam may then be imaged through a diffractive interference pattern generating element, such as a holographic element fabricated with the desired pattern in mind.

Image reader may include an illumination assembly 142 for illuminating target area T. Illumination assembly 142 may also include one or more power supplies 144, illumination sources 146 and illumination optics 148.

A communications module 180 provides a communication link from imaging reader 14 to other imaging readers or to other systems such as host processor 118, memory 166, network 120, or server/remote processor 124.

The processor, memory and associated circuitry which performs or controls the exemplary image manipulations or rectifications (e.g. image cropping and image rotating functions) described hereinbefore may be provided in the image reader assembly 12 or on associated circuit boards 15 which are located within the housing 116 of the image reader 14.

While exemplary embodiments been explained with reference to the structure disclosed herein, it is not confined to the details set forth and this invention is intended to cover any modifications and changes as may come within the scope and spirit of the following claims.

The invention claimed is:

1. A method of operating an image reader comprising:
searching a digital image for nominally straight edges;
characterizing the nominally straight edges in terms of length and/or direction;
establishing a first group of edges as a function of their proximity to the digital image's center;
establishing a second group of edges as a function of their proximity to other remaining edges;
transmuting a rectangle bounding the first group of edges and the second group of edges into a rectified image; and
wherein the rectified image is an image that is cropped by discarding portions of the digital image outside of the rectangle.

2. The method of claim 1, comprising searching the digital image in high resolution and low resolution.

3. The method of claim 1, comprising:
determining a predominant orientation of the nominally straight edges; and
discarding edges that are not nominally parallel or perpendicular to the determined predominate orientation.

4. The method of claim 1, comprising rotating the digital image.

5. The method of claim 1, comprising capturing the digital image and automatically searching the digital image for nominally straight edges.

6. The method of claim 1, comprising:
capturing the digital image in high resolution and low resolution at the same time; and
searching the digital image in high resolution and low resolution.

7. A method of operating an image reader comprising:
searching a digital image at a high resolution for nominally straight edges;
searching the digital image at a low resolution for nominally straight edges;
characterizing the nominally straight edges in terms of length and/or direction;
determining a predominant orientation of the nominally straight edges;
discarding edges that are not nominally parallel or perpendicular to the determined predominate orientation;
establishing a first group of edges as a function of their proximity to the digital image's center;
establishing a second group of edges as a function of their proximity to other remaining edges;
transmuting a rectangle bounding the first group of edges and the second group of edges into a rectified image; and
wherein the rectified image is an image that is cropped by discarding portions of the digital image outside of the rectangle.

8. The method of claim 7, comprising rotating the digital image.

9. The method of claim 7, comprising capturing the digital image and automatically searching the digital image at a low resolution for nominally straight edges.

10. The method of claim 7, comprising capturing the digital image in high resolution and low resolution at the same time.

11. An indicia reading device comprising:
   an image sensor for outputting signals representative of an image in a field of view; and
   a processor communicatively connected to the image sensor, the processor being configured for:
      searching an image for nominally straight edges;
      characterizing the nominally straight edges in terms of length and/or direction;
      establishing a first group of edges as a function of their proximity to the image's center;
      establishing a second group of edges as a function of their proximity to other remaining edges;
      transmuting a rectangle bounding the first group of edges and the second group of edges into a rectified image; and
      wherein the rectified image is an image that is cropped by discarding portions of the image outside of the rectangle.

12. The device of claim 11, wherein the processor is configured for searching the image in high resolution and low resolution.

13. The device of claim 11, wherein the processor is configured for:
   determining a predominant orientation of the nominally straight edges; and
   discarding edges that are not nominally parallel or perpendicular to the determined predominate orientation.

14. The device of claim 11, wherein the processor is configured for rotating the image.

15. The device of claim 11, wherein the processor is configured for capturing the image and automatically searching the image for nominally straight edges.

16. The device of claim 11, wherein the processor is configured for:
   capturing the image in high resolution and low resolution at the same time; and
   searching the image in high resolution and low resolution.

17. An indicia reading device comprising:
   an image sensor for outputting signals representative of an image in a field of view; and
   a processor communicatively connected to the image sensor, the processor being configured for:
      searching an image at a high resolution for nominally straight edges;
      searching the image at a low resolution for nominally straight edges;
      characterizing the nominally straight edges in terms of length and/or direction;
      determining a predominant orientation of the nominally straight edges;
      discarding edges that are not nominally parallel or perpendicular to the determined predominate orientation
      establishing a first group of edges as a function of their proximity to the image's center;
      establishing a second group of edges as a function of their proximity to other remaining edges;
      transmuting a rectangle bounding the first group of edges and the second group of edges into a rectified image; and
      wherein the rectified image is an image that is cropped by discarding portions of the digital image outside of the rectangle.

18. The device of claim 17, wherein the processor is configured for rotating the image.

19. The device of claim 17, wherein the processor is configured for capturing the image and automatically searching the image at a low resolution for nominally straight edges.

20. The device of claim 17, wherein the processor is configured for capturing the digital image in high resolution and low resolution at the same time.

* * * * *